United States Patent
Barbu et al.

(10) Patent No.: US 12,282,108 B1
(45) Date of Patent: Apr. 22, 2025

(54) TIMING ERROR CORRECTION IN POSITIONING OF TERMINAL DEVICE

(71) Applicant: Nokia Technologies Oy, Espoo (FI)

(72) Inventors: Oana-Elena Barbu, Aalborg (DK); Ryan Keating, Chicago, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/842,861

(22) PCT Filed: Feb. 2, 2023

(86) PCT No.: PCT/EP2023/052512
§ 371 (c)(1),
(2) Date: Aug. 30, 2024

(87) PCT Pub. No.: WO2023/165776
PCT Pub. Date: Sep. 7, 2023

Related U.S. Application Data

(60) Provisional application No. 63/268,765, filed on Mar. 2, 2022.

(51) Int. Cl.
*G01S 5/02* (2010.01)
*H04L 5/00* (2006.01)

(52) U.S. Cl.
CPC ............ *G01S 5/021* (2013.01); *H04L 5/0005* (2013.01)

(58) Field of Classification Search
CPC ............................. G01S 5/021; H04W 64/00
(Continued)

(56) References Cited

U.S. PATENT DOCUMENTS

| | | | |
|---|---|---|---|
| 2020/0220752 A1* | 7/2020 | Shi | H04L 5/0051 |
| 2024/0019524 A1* | 1/2024 | Duan | G01S 5/021 |
| 2024/0276438 A1* | 8/2024 | Mu | H04W 64/00 |

FOREIGN PATENT DOCUMENTS

| | | |
|---|---|---|
| EP | 3496483 A1 | 6/2019 |
| GB | 2576049 A | 2/2020 |

(Continued)

OTHER PUBLICATIONS

International Search Report issued by the European Patent Office acting as the International Searching Authority in relation to International Application No. PCT/EP2023/052512 dated May 16, 2023 (3 pages).

(Continued)

*Primary Examiner* — Kiet M Doan
(74) *Attorney, Agent, or Firm* — Robert P. Michal, Esq.; Carter, DeLuca & Farrell LLP

(57) ABSTRACT

A method for calibrating timing errors to improve positioning accuracy includes receiving, from a network element, calibration configuration information for communicating at least one positioning reference signal; communicating, during a positioning session and on the basis of the received calibration configuration information, a first positioning reference signal according to a first positioning reference signal pattern; and communicating, during the positioning session or during another positioning session and on the basis of the received calibration configuration information, a second positioning reference signal according to a second positioning reference signal pattern, wherein the second number of frequency resource elements is smaller than the first number of frequency resource elements and/or wherein the second number of time resource elements is greater than the first number of time resource elements.

17 Claims, 7 Drawing Sheets

(58) Field of Classification Search
USPC .................. 370/329; 327/156; 342/357.4
See application file for complete search history.

(56) References Cited

FOREIGN PATENT DOCUMENTS

| | | |
|---|---|---|
| WO | 2011003030 A1 | 1/2011 |
| WO | 2016163943 A1 | 10/2016 |

OTHER PUBLICATIONS

Written Opinion of the International Searching Authority issued by the European Patent Office acting as the International Searching Authority in relation to International Application No. PCT/EP2023/052512 dated May 16, 2023 (6 pages).

\* cited by examiner

TIMING ERROR CORRECTION IN POSITIONING OF TERMINAL DEVICE

CROSS-REFERENCE TO RELATED APPLICATIONS

This application is a national phase entry under 35 U.S.C. 371 of PCT International Application No. PCT/EP2023/052512 filed Feb. 2, 2023, which claims priority to U.S. Provisional Patent Application No. 63/268,765, filed Mar. 2, 2022, the disclosure of each of these applications is expressly incorporated herein by reference in their entirety.

FIELD

Various embodiments described herein relate to the field of wireless communications and, particularly, to positioning a terminal device of a cellular communication system by using multiple transmission-reception points.

BACKGROUND

Positioning of a terminal device is used in modern cellular communication systems for various purposes, such as improving system operation and provision of location-based communication services. The positioning may be carried out as multi-lateration with the help of multiple transmission-reception points (TRPs). The TRPs can be access nodes (eNode B, gNode B) or other positioning reference units (PRUs). The multi-lateration may be based on measuring a time-difference or arrival and an angle of arrival of a signal. The signal may be transmitted by the TRPs and received and measured by the terminal device (different signal from each TRP), or it can be transmitted by the terminal device and received and measured by the TRPs. Since the measured parameter is time difference of signals exchanged between the terminal device and the different TRPs, timing errors degrade positioning precision and accuracy. For example, there is a transmission timing error and a reception timing error induced by delays in hardware of a transmitter and a receiver. The timing errors may further exist as a result of a carrier frequency offset, a symbol timing offset, and phase noise.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus, comprising means for performing: receiving, from a network element, calibration configuration information for communicating at least one positioning reference signal and for reducing timing error affecting positioning of the apparatus; communicating, during a positioning session and on the basis of the received calibration configuration information, a first positioning reference signal according to a first positioning reference signal pattern for reducing a timing error of a first type, the first positioning reference signal pattern defining a first number of frequency resource elements and a first number of time resource elements for the first positioning reference signal; and communicating, during the positioning session or during another positioning session and on the basis of the received calibration configuration information, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and/or wherein the second number of time resource elements is greater than the first number of time resource elements.

In an embodiment, the means are configured to transmit to the network element, before receiving the calibration configuration information, at least one message indicating a need for reducing the timing error, to receive the first positioning reference signal and the second positioning reference signal, and to perform timing error reduction on the basis of the received first positioning reference signal and second positioning reference signal.

In an embodiment, the received calibration configuration information comprises a first message indicating the first positioning reference signal pattern and a second message indicating the second positioning reference signal pattern.

In an embodiment, the means are configured to transmit, before receiving the first positioning reference signal, a message indicating a need to reduce the timing error of the first type but not the timing error of the second type, and to transmit before receiving the second positioning reference signal, a message indicating a need to reduce the timing error of the second type but not the timing error of the first type.

In an embodiment, the timing error of the first type is a result of a symbol timing offset or a carrier frequency offset and the timing error of the second type is a result of phase noise.

In an embodiment, the means are configured to: receive the first positioning reference signal and to perform both timing error reduction and positioning measurements on the basis of the first positioning reference signal, and to receive the second positioning reference signal and to perform both timing error reduction and positioning measurements on the basis of the second positioning reference signal, and to report the positioning measurements to the network element.

In an embodiment, the means are configured to receive the first positioning reference signal and the second reference signal from at least one transmission-reception node configured to assist in the positioning of the apparatus.

In an embodiment, the calibration configuration information indicates at least one calibration interval for communicating the first positioning reference signal and the second positioning reference signal, and wherein the means are configured to both transmit and receive the first positioning reference signal and the second positioning reference signal during the at least one calibration interval, and to perform the timing error reduction on the basis of the received first positioning reference signal and second positioning reference signal.

According to an aspect, there is provided an apparatus comprising means for performing: transmitting, to a terminal device, calibration configuration information for communicating at least one positioning reference signal and for reducing timing error affecting positioning of the terminal device; causing the terminal device to communicate, during a positioning session of the terminal device, a first positioning reference signal according to a first positioning reference signal pattern for reducing a timing error of a first type, the first positioning reference signal pattern defining a first number of frequency resource elements and a first number of time resource elements for the first positioning reference signal; causing the terminal device to communicate, during the positioning session or another positioning session, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and wherein the second number of time resource elements is greater than the first number of time resource elements.

In an embodiment, the means are configured receive, from the terminal device during the positioning session, a timing error report indicating a need for reducing timing error, and to transmit the calibration configuration information as a response to the timing error report.

In an embodiment, the means are configured to:
if the timing error report indicates a need to reduce the timing error of the first type, transmit to the terminal device calibration configuration information causing the communication of the first positioning reference signal; and
if the timing error report indicates a need to reduce the timing error of the second type, transmit to the terminal device calibration configuration information causing the communication of the second positioning reference signal.

In an embodiment, the timing error report indicates a need for reducing a timing error of a third type, and wherein the means are configured to, in response to the need for reducing timing errors of both the first type and the second type, transmit to the terminal device calibration configuration information causing communication of a third positioning reference signal according to a third positioning reference signal pattern for reducing the timing errors of both the first type and the second type, the third positioning reference signal pattern defining a third number of frequency resource elements and a third number of time resource elements for the third positioning reference signal, wherein the third number of frequency resource elements is greater than the second number of frequency resource elements and wherein the third number of time resource elements is greater than the first number of time resource elements.

In an embodiment, the means are configured to:
receive from the terminal device and at least one other terminal device, before transmitting the calibration configuration information, a timing error report indicating a need for reducing the timing error of the first type;
transmit to the terminal device and the at least one other terminal device, as the calibration configuration information, an indication of the first positioning reference signal pattern, and
configure the transmission-reception node to transmit the first positioning reference signal to the terminal device and the at least one other terminal device for reducing the timing error of the first type.

In an embodiment, the means are configured to receive, in response to the communication of the first positioning reference signal and the second positioning reference signal, measurement data indicating a location of the terminal device and to estimate the location of the terminal device on the basis of the measurement data.

In an embodiment, the means comprises at least one processor and at least one memory storing instructions that cause said performance of the apparatus.

According to an aspect, there is provided a method comprising: receiving, from a network element, calibration configuration information for communicating at least one positioning reference signal and for reducing timing error affecting positioning of a terminal device; communicating, during a positioning session and on the basis of the received calibration configuration information, a first positioning reference signal according to a first positioning reference signal pattern for reducing a timing error of a first type, the first positioning reference signal pattern defining a first number of frequency resource elements and a first number of time resource elements for the first positioning reference signal; and communicating, during the positioning session or during another positioning session and on the basis of the received calibration configuration information, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and/or wherein the second number of time resource elements is greater than the first number of time resource elements.

In an embodiment, the method further comprises:
transmitting to the network element, before receiving the calibration configuration information, at least one message indicating a need for reducing the timing error,
receiving the first positioning reference signal and the second positioning reference signal, and
performing timing error reduction on the basis of the received first positioning reference signal and second positioning reference signal.

In an embodiment, the received calibration configuration information comprises a first message indicating the first positioning reference signal pattern and a second message indicating the second positioning reference signal pattern.

In an embodiment, the method further comprises:
transmitting, before receiving the first positioning reference signal, a message indicating a need to reduce the timing error of the first type but not the timing error of the second type, and
transmitting before receiving the second positioning reference signal, a message indicating a need to reduce the timing error of the second type but not the timing error of the first type.

In an embodiment, the timing error of the first type is a result of a symbol timing offset or a carrier frequency offset and the timing error of the second type is a result of phase noise.

In an embodiment, the terminal device receives the first positioning reference signal and performs both timing error reduction and positioning measurements on the basis of the first positioning reference signal, and receives the second positioning reference signal and performs both timing error reduction and positioning measurements on the basis of the second positioning reference signal, and reports the positioning measurements to the network element.

In an embodiment, the terminal device receives the first positioning reference signal and the second reference signal from at least one transmission-reception node configured to assist in the positioning of the terminal device.

In an embodiment, the calibration configuration information indicates at least one calibration interval for communicating the first positioning reference signal and the second positioning reference signal, and wherein the terminal device both transmits and receives the first positioning reference signal and the second positioning reference signal during the at least one calibration interval, and performs the timing error reduction on the basis of the received first positioning reference signal and second positioning reference signal.

According to an aspect, there is provided a method comprising: transmitting, to a terminal device, calibration configuration information for communicating at least one positioning reference signal and for reducing timing error affecting positioning of the terminal device; causing the terminal device to communicate, during a positioning session of the terminal device, a first positioning reference signal according to a first positioning reference signal pattern for reducing a timing error of a first type, the first positioning reference signal pattern defining a first number of frequency resource elements and a first number of time resource elements for the first positioning reference signal; causing the terminal device to communicate, during the positioning session or another positioning session, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and wherein the second number of time resource elements is greater than the first number of time resource elements.

In an embodiment, the method further comprising receiving, from the terminal device during the positioning session, a timing error report indicating a need for reducing timing error, and transmitting the calibration configuration information as a response to the timing error report.

In an embodiment,
if the timing error report indicates a need to reduce the timing error of the first type, calibration configuration information causing the communication of the first positioning reference signal is transmitted to the terminal device; and
if the timing error report indicates a need to reduce the timing error of the second type, calibration configuration information causing the communication of the second positioning reference signal is transmitted to the terminal device.

In an embodiment, the timing error report indicates a need for reducing a timing error of a third type, and the method comprises:
in response to the need for reducing timing errors of both the first type and the second type, transmitting to the terminal device calibration configuration information causing communication of a third positioning reference signal according to a third positioning reference signal pattern for reducing the timing errors of both the first type and the second type, the third positioning reference signal pattern defining a third number of frequency resource elements and a third number of time resource elements for the third positioning reference signal, wherein the third number of frequency resource elements is greater than the second number of frequency resource elements and wherein the third number of time resource elements is greater than the first number of time resource elements.

In an embodiment, the method comprises:
receiving from the terminal device and at least one other terminal device, before transmitting the calibration configuration information, a timing error report indicating a need for reducing the timing error of the first type;
transmitting to the terminal device and the at least one other terminal device, as the calibration configuration information, an indication of the first positioning reference signal pattern, and
configuring the transmission-reception node to transmit the first positioning reference signal to the terminal device and the at least one other terminal device for reducing the timing error of the first type.

In an embodiment, the method further comprises receiving, in response to the communication of the first positioning reference signal and the second positioning reference signal, measurement data indicating a location of the terminal device and estimating the location of the terminal device on the basis of the measurement data.

According to an aspect, there is provided a computer program embodied on a computer-readable medium and comprising a computer program code readable by a computer, wherein the computer program code configures the computer to carry out a computer process comprising: receiving, from a network element, calibration configuration information for communicating at least one positioning reference signal and for reducing timing error affecting positioning of a terminal device; communicating, during a positioning session and on the basis of the received calibration configuration information, a first positioning reference signal according to a first positioning reference signal pattern for reducing a timing error of a first type, the first positioning reference signal pattern defining a first number of frequency resource elements and a first number of time resource elements for the first positioning reference signal; and communicating, during the positioning session or during another positioning session and on the basis of the received calibration configuration information, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and/or wherein the second number of time resource elements is greater than the first number of time resource elements.

According to an aspect, there is provided a computer program embodied on a computer-readable medium and comprising a computer program code readable by a computer, wherein the computer program code configures the computer to carry out a computer process comprising: transmitting, to a terminal device, calibration configuration information for communicating at least one positioning reference signal and for reducing timing error affecting positioning of the terminal device; causing the terminal device to communicate, during a positioning session of the terminal device, a first positioning reference signal according to a first positioning reference signal pattern for reducing a timing error of a first type, the first positioning reference signal pattern defining a first number of frequency resource elements and a first number of time resource elements for the first positioning reference signal; causing the terminal device to communicate, during the positioning session or another positioning session, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and wherein the second number of time resource elements is greater than the first number of time resource elements.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
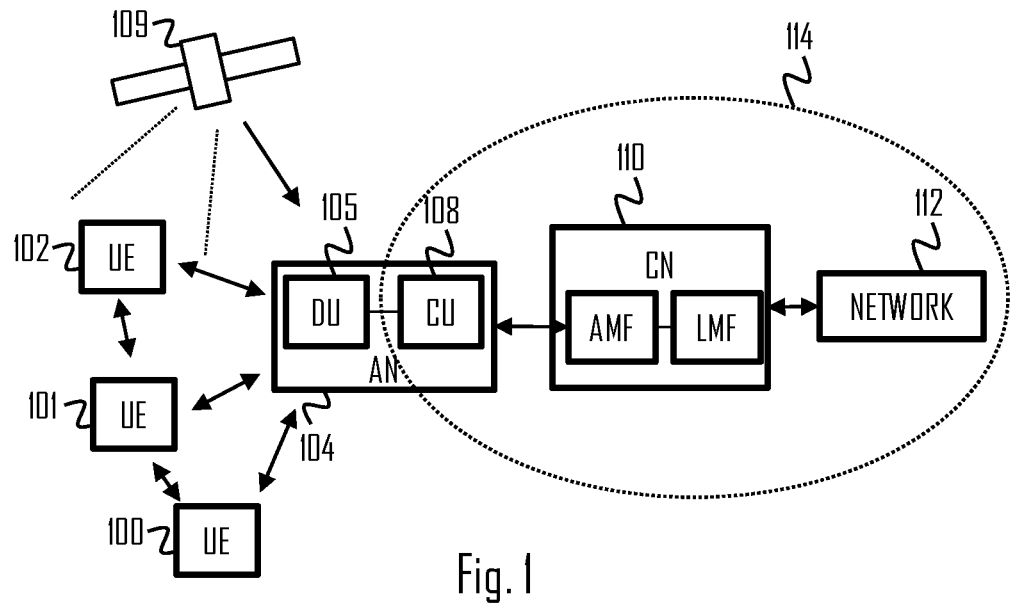

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, a network element in a radio access network or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. In the context of 5G New Radio, the core network employs a service-based architecture, as known in the art With respect to positioning, the service-based architecture (core network) comprises an access and mobility management function (AMF) and a location management function (LMF). The AMF provides location information for call processing, policy, and charging to other network functions in the core network and to other entities requesting for positioning of terminal devices. The AMF receives and manages location requests from several sources: mobile-originated location requests (MO-LR) from the terminal devices and mobile-terminated location requests (MT-LR) from other functions of the core network or from other network elements. The AMF selects the LMF for each request and uses its positioning service to trigger a positioning session. The LMF then carries out the positioning upon receiving such a request from the AMF. The LMF manages the resources and timing of positioning activities. An LMF uses a Namf_Communication service on an NL1 interface to request positioning of a terminal device from one or more access nodes, or communicates with the terminal device over N1 for UE-based or UE-assisted positioning. The positioning may include estimation of a location and, additionally, the LMF may also estimate movement or accuracy of the location information when requested. Connection-wise, the AMF is between the access node and the LMF and, thus, closer to the access nodes than the LMF.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave-sub-THz). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Figure 2:
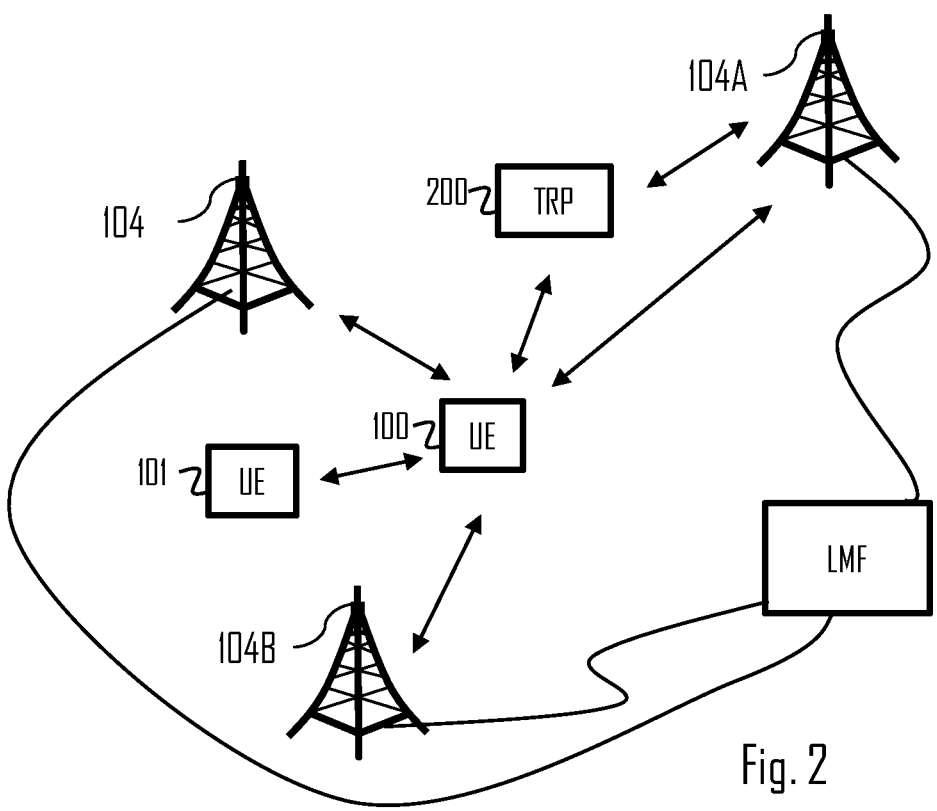
FIG. 2 illustrates a positioning scenario for some embodiments.

FIG. 2 illustrates an example of a positioning scenario to which embodiments described below may be implemented. Let us assume that the terminal device 100 is the one that is to be positioned. Multiple transmission-reception points (TRPs) may be involved in the positioning. The TRPs may include access nodes 104, 104A, 104B communicating with the terminal device and other terminal devices by transferring data and signalling information. Additionally, or alternatively, the TRPs may include one or more dedicated TRPs 200 having the positioning as a primary objective. They may be road-side units or other nodes that assist in improving the positioning accuracy. Yet additionally, or alternatively, the TRPs may include other terminal devices 101. Such positioning may employ sidelink communications where terminal devices communicate directly with one another without mediating traffic through an access node.

The positioning may be based on communicating positioning reference signals between the terminal device 100 and the TRPs and measuring the positioning reference signals for the purpose of positioning the terminal device 100. Measured parameters (measurement data) derived from the received reference signals may include at least some of the following parameters: a reference signal reception time, reference signal transmission delay (RSTD), reference signal angle-of-arrival, and a reference signal reception power (RSRP). For positioning based on measuring a reception delay of a reference signal, the reception time or transmission delay and the angle-of-arrival may be measured. The reception time or transmission delay is used to measure a length of a propagation path between a device transmitting the reference signal and a device receiving the reference signal, and the angle-of-arrival may be measured for the purpose of detecting possible multi-path propagation that affects the reception time and the delay by distorting the measurements. As described in connection with the embodiments below, the transmitting device may be the terminal device 100 or a transmission-reception point (TRP) (an access node, dedicated TRP, or another terminal device at a fixed or otherwise known location), and the receiving device may be either the terminal device 100 or the TRP. However, the communication of the reference signal is conventionally carried out between the terminal device 100 and multiple TRPs. The measurement data acquired by receiving and measuring a positioning reference signal (PRS) may be reported to a network element acting as a location management function (LMF) configured to carry out the positioning of the terminal device on the basis of the measurement data. The LMF may estimate a location of the terminal device on the basis of the received measurement data and the known locations of the TRP(s) by using a state-of-the-art positioning method.

The positioning accuracy is degraded by various characteristics of the transmitting and receiving devices. For example, there exist various delays in the transmitter and receiver chain that, unless compensated, increase the inaccuracy of the positioning. An example of such a delay is an uncompensated delay from a baseband circuit of a transmitting device to an antenna. The following definitions may be used to understand discussion of timing errors that are present in the transmitting device and in the receiving device. A transmission timing error may be understood from a signal transmission perspective such that there will be a time delay from the time when a digital signal is generated at baseband to the time when a radio frequency (RF) signal is transmitted from the antenna. For supporting positioning, an internal calibration/compensation of the transmission time delay may be performed in the transmitting device for the transmission of the PRS signals. The calibration/compensation may also include calibration/compensation of a relative time delay between different RF chains in the same transmitting device. A remaining transmission time delay after the calibration is defined as the transmission timing error, and it may be dependent on various factors, such as temperature, bandwidth of the transmitted signal, and noise.

A reception timing error may be understood from a signal reception perspective such that there will be a time delay from the time when the RF signal arrives at the antenna to the time when the signal is digitized and time-stamped at the baseband. For supporting positioning, the receiving device may implement an internal calibration/compensation of the reception time delay before it reports the positioning measurements that are obtained from the measured PRS signals. The calibration/compensation may also include calibration/compensation of the relative time delay between different RF chains in the same receiving device. However, the calibration may not be perfect, and the remaining reception time delay after the calibration is defined as the reception timing error.

A transmission timing error group is associated with transmissions of one or more PRSs for the positioning purpose that have the Tx timing errors within a certain margin. A reception timing error group is associated with one or more PRS measurements that have the reception timing errors within a certain margin. A reception-transmission timing error group may be understood as a transmission timing error group of a transmitting device of a PRS plus a reception timing error group of a receiving device of the PRS.

In the positioning that involves measuring the propagation delay of a PRS between the transmitting device and the receiving device, the positioning is obviously affected by the above-described timing errors, resulting in inaccuracy of the positioning. To mitigate the positioning errors, a conventional solution is to report the timing error group and, thus, indicate to the LMF a range within which the timing measurements can vary. For example, the terminal device may report per antenna panel or per PRS resource, a timing error group of +/−30 nanoseconds (ns), which means that a transmitter chain used for that particular PRS resource may introduce an error within the interval [−30, 30] ns. The timing errors may appear due to, for example, sampling time offset (STO) between clock rates of the transmitting device and the receiving device of the PRS, a carrier frequency offset (CFO) between carrier frequencies of the transmitting device and the receiving device of the PRS, and/or phase noise (PN). Note that STO, CFO, PN (and in general any other delays introduced in the transmitter and receiver chains) vary over time, temperature, bandwidth, carrier frequency, etc. After receiving the inaccuracy range, the LMF may decide how to deal with the measurements labelled with the respective timing error group when computing the location of the terminal device. For example, if a sufficient number of measurements are collected, then the LMF may decide to use the measurements in a weighted manner where the weights are inversely proportional to the TEG level. However, such approach does not remove the timing errors, but only gives an indication of how accurate the final location estimation is expected to be. In other words, such a solution identifies the timing error group(s) but not to provide means for cancelling the timing errors.

Alternatively, the timing error group reporting may be used to create further differential measurements, e.g. to combine PRS time delay measurements that have the same reception timing error group. This type of grouping and further differentiating enables removal of the effects of timing errors, but only if there are a sufficient number of measurements taken with the same timing error group. It does not enable combing measurements across TRPs, if those TRPs have different timing error groups (which is typical). In order to improve the positioning accuracy, e.g. to meet a centimeter level positioning accuracy, merely identifying the timing error ranges is not sufficient and computing and reducing the transmission and reception timing errors would be beneficial, similarly to a calibration procedure applied to data reception on the basis of a demodulation reference signal, for example. With respect to the above-described sources of error (STO, CFO, such errors are readily corrected for data reception, e.g. on the basis of the demodulation reference signal. The PN may be compensated by using the same principles and a suitable reference signal. Since the actual timing error estimation and reduction (correction) is readily known in the art in connection with data reception, this description does not dwell deep into details in that respect. For example, the timing error estimation and reduction procedure may assume the received PRS y as:

$$y \approx H_1(f_o, t_o, \phi_o) H_2(a_1, \tau_1, \ldots, a_L, \tau_L) x + n,$$

where $H_1(f_o, t_o, \phi_o)$ is a channel response observed in a receiving device of the PRS, i.e. the receiver chain of the terminal device that introduces an unknown carrier frequency offset $f_o$, a time offset $t_o$ and a phase offset $\phi_o$. $H_2(a_1, \tau_1, \ldots, a_i, \tau_i)$ is the response of the wireless propagation channel where $(a_i, \tau_i)$ are and amplitude and a delay of the signal reflected by obstacle i. The procedure may use the model above and aim to estimate the unknown timing error $g_0 = (f_o, t_o, \phi_0)$ and $(a_i, \tau_i)$, i=1:L. Note that some of the timing error types $(f_o, t_o, \phi_o)$ may be available from e.g. data reception, which reduces the estimation complexity. The procedure may then solve the following by using state-of-the-art solvers such as the Newton method:

$$\widehat{g_0}, \hat{a}, \hat{\tau} = \arg \min \|y - H_1(f_o, t_o, \phi_o) H_2(a_1, \tau_1, \ldots, a_L, \tau_L) x\|_2^2$$

The reduction of the timing error may be carried out by at least reducing the effects of the CFO, STO, and/or PN. The CFO, STO, and PN manifest in different ways, and they can be localized for estimation and reduction by using different reference signal properties. For example, the PN localizes in a time domain while the STO localizes in a frequency domain. In general, all these reference signals may have some common properties e.g., they may be CAZAC sequences. Because of different localization of the timing errors of different sources, the allocation of the respective reference signals may be subjected to the type of timing error that needs to be reduced. For example, since the PN is substantially equal for all subcarriers, then a reference signal for estimating and reducing timing error resulting from the PN may localize in the time domain, e.g. occupy a single subcarrier or few sub-carriers but multiple time-domain symbols. Conversely, the STO manifests differently at each subcarrier, a reference signal for estimating and correcting the timing error resulting from the STO may occupy a denser frequency allocation (more sub-carriers) than the reference signal for estimating the PN. On the other hand, a smaller number of time-domain symbols may be used. A reference signal for estimating the CFO may occupy a number of sub-carriers and a number of time-domain symbols between the two above-described reference signals.

Accordingly, for data reception from the serving cell each timing error type may be estimated and reduced by using a dedicated reference signal preceding the actual data symbols. This approach may not be suitable for a positioning session due to the enormous signaling overhead generated by such reference signals: the LMF would need to allocate dense but distinguishable PRS resources in time, frequency, and space for each transmitting device (e.g. TRP), so that the positioning receiver (e.g. the terminal device) is able to discriminate between the positioning measurements due to wireless propagation and the timing error (cumulative STO, CFO, PN) per time-frequency resource block (e.g. a physical resource block of 12 sub-carriers per one time-domain symbol), per RF carrier, and per TRP. Since a single positioning session may involve even dozens of TRPs, transmission of dozens of PRSs, potentially on multiple RF carriers, will quickly result in a substantial part of the spectrum being occupied by PRSs.

Figure 3:
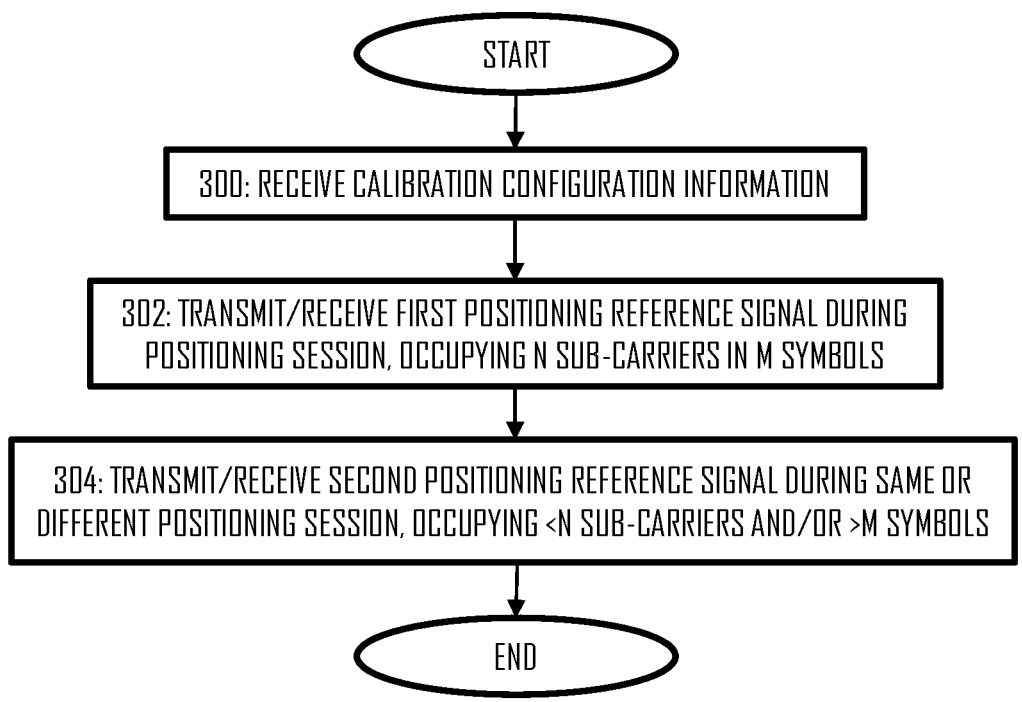
FIGS. 3 and 4 illustrate flow diagrams of processes for calibrating a timing error according to some embodiments.
Figure 4:
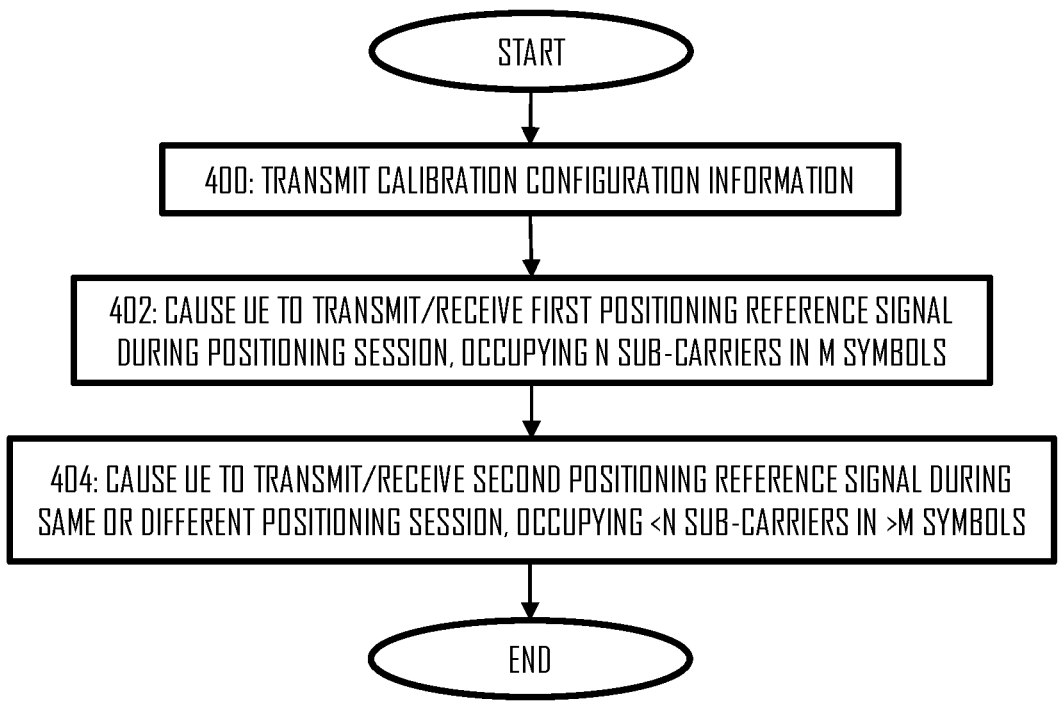

FIGS. 3 and 4 illustrate embodiments for positioning of a terminal device. FIG. 3 illustrates a method executed by the terminal device 100 being positioned during one or more positioning sessions or by a TRP involved in the positioning of the terminal device 100, while FIG. 4 illustrates a method executed by an apparatus for a core network operating the LMF (e.g. the network element such as the LMF).

Referring to FIG. 3, the method executed by an apparatus for the terminal device or the TRP comprises: receiving (block 300), from a network element, calibration configuration information for communicating at least one positioning reference signal and for reducing timing error affecting positioning of the apparatus; communicating (transmitting or receiving), during a positioning session and on the basis of the received calibration configuration information (block 302), a first positioning reference signal according to a first positioning reference signal pattern for reducing a timing error of a first type, the first positioning reference signal pattern defining a first number of frequency resource elements and a first number of time resource elements for the first positioning reference signal; and communicating (transmitting or receiving), during the positioning session or during another positioning session and on the basis of the received calibration configuration information (block 304), a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and/or wherein the second number of time resource elements is greater than the first number of time resource elements.

Referring to FIG. 4, the process executed by an apparatus for the network element (e.g. the LMF) comprises: transmitting (block 400), to a terminal device and optionally to a TRP, calibration configuration information for communicating at least one positioning reference signal and for reducing timing error affecting positioning of the terminal device; causing (block 402) the terminal device (UE) to communicate (transmit or receive), during a positioning session of the terminal device, a first positioning reference signal according to a first positioning reference signal pattern for reducing a timing error of a first type, the first positioning reference signal pattern defining a first number of frequency resource elements and a first number of time resource elements for the first positioning reference signal; and causing (block 404) the terminal device to communicate (transmit or receive), during the positioning session or another positioning session, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and wherein the second number of time resource elements is greater than the first number of time resource elements.

An advantage of providing the different PRS patterns with different numbers of frequency resource elements (sub-carriers) and time resource elements (time-domain symbols) enables tailoring the PRS for a specific type of timing error. Accordingly, the timing error correction can be made without the enormous signaling overhead. The terminal device and/or the TRPs may monitor the timing error status per timing error type and indicate to the network element (LMF) the calibration need per timing error type. Then, the LMF may allocate a PRS tailored to the calibration need, thus reducing the number of communicated PRS symbols.

Figure 5:
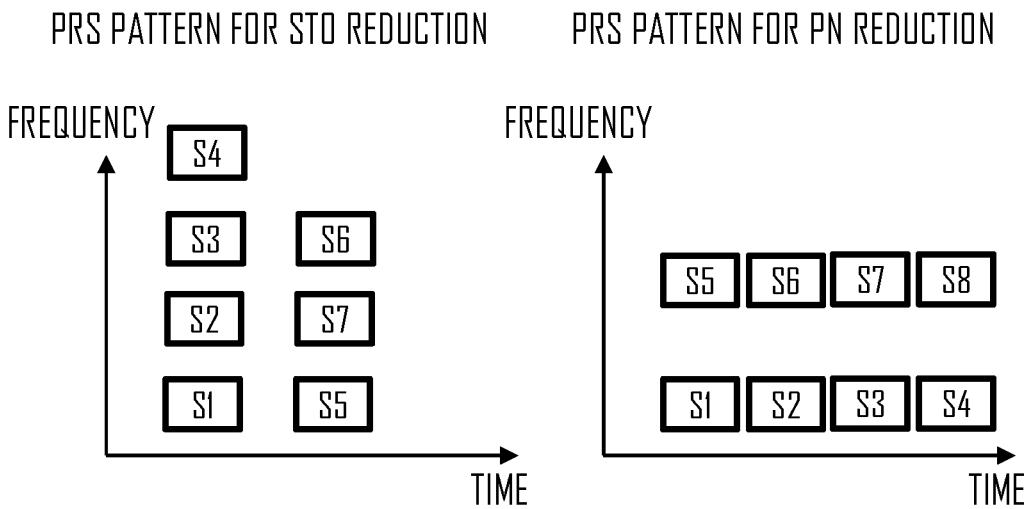
FIG. 5 illustrates some embodiments of a positioning reference signal tailored for particular types of timing errors.

FIG. 5 illustrates some embodiments of the tailored PRSs, one for reducing the timing error caused by the STO (left-hand side of FIG. 5) and one for reducing the timing error caused by the PN (right-hand side of FIG. 5). As described above, the STO localizes in the frequency domain so the PRS tailored for reducing the STO may also be arranged to localize in the frequency domain by occupying a greater number of sub-carriers than time-domain symbols. In this example that is an over-simplification, the PRS pattern defines four sub-carriers on a first time-domain symbol and three sub-carriers on a second time-domain symbol that follows the first time-domain symbol, either directly or after one or more symbols. In reality, the number of occupied sub-carriers may be greater than what is illustrated in this example. With respect to the PN, the PN localizes in the time domain so the PRS tailored for reducing the PN may also be arranged to localize in the frequency domain by occupying a greater number of time-domain symbols than sub-carriers. In this example that is an over-simplification, the PRS pattern defines two sub-carriers on four time-domain symbols. In reality, the number of occupied time-domain symbols may be greater than what is illustrated in this example. The PRS tailored for the CFO may form a hybrid of the two examples, thus occupying a greater number of time-domain symbols but less sub-carriers than the PRS tailored for the STO and less time-domain symbols but greater number of sub-carriers than the PRS tailored for the PN.

A PRS pattern may be defined by the network element by using the following parameters: a repetition rate R (a number of consecutive time-domain symbols allocated to the PRS signal); and a frequency comb C (a number of sub-carriers between PRS subcarriers in a time-domain symbol). C thus defines the density of PRS symbols in the frequency-domain. In an embodiment, the following PRS pattern types may be pre-defined and allocatable by the network element. A PRS type 0 pattern may be a legacy PRS dedicated to positioning measurements. This may be identical or substantially identical to a reference signal pattern used in connection with data transmissions. A PRS type 1 pattern (high density in frequency domain, low density in time-domain) may be associated with STO estimation, in addition to the standard positioning measurements collection, and it may follow the principles of the PRS pattern illustrated in FIG. 5 for the STO reduction. A PRS type 2 pattern (medium density in frequency domain, medium density in time-domain) may be associated with the CFO estimation and have the above-described time-frequency pattern. A PRS type 3 pattern (low density in frequency domain, high density in time-domain) may be used to perform the PN estimation and localize in the time-domain, as illustrated in FIG. 5. A PRS type 4 pattern (high density in frequency domain, high density in time-domain) may have high density in both time and frequency domain and it may be dedicated for reducing all the timing error types (STO, CFO, PN).

In an embodiment, the network element configures the TRPs to transmit and the terminal device to receive the tailored PRSs. Each TRP may transmit a TRP in unique time-frequency resources so that the terminal device is capable of distinguishing each TRP so that the PRS measurements are linked to the correct TRP and, thus, reported correctly to the network element. In another embodiment, the terminal device is configured to transmit the tailored PRSs and the TRPs to receive the tailored PRSs. In yet another embodiment described below, the tailored PRSs are used by the terminal device in a self-calibration procedure where the terminal device both transmits and receives the tailored PRSs. In such a case, the terminal device would be both the transmitting device and the receiving device of the PRSs.

With respect to the definition of the positioning session, the positioning session may refer either to a single positioning occasion (one-time positioning of a location of the terminal device) or to a session where mobility of the terminal device is monitored via a series of multiple independent positioning occasions. In the former case, the single positioning occasion may include transmission/reception of multiple PRSs having different PRS patterns, e.g. one of each patterns illustrated in FIG. 5. In the latter case, multiple positioning occasions inherently include transmission of multiple PRS between the terminal device and each TRP involved in each positioning occasion. During the positioning session or even the positioning occasion, one TRP may be configured to transmit the PRS according to the first PRS pattern (for correcting the STO), and the terminal device may both carry out the STO correction/reduction and measure the PRS having the first PRS pattern. Another TRP may be configured to transmit the PRS according to the second PRS pattern (for correcting the PN), and the terminal device may both carry out the PN correction/reduction and measure the PRS having the second PRS pattern. Yet another TRP may be configured to transmit a PRS according to a further PRS pattern for correcting the CFO, and the terminal device may both carry out the CFO correction/reduction and measure the PRS having the further PRS pattern. Accordingly, timing errors of all timing error types may be corrected/reduced by using the tailored PRSs, thus reducing the signaling overhead and improving the accuracy of the positioning.

In an embodiment, the receiving device (the terminal device or a TRP) transmits to the network element, before receiving the calibration configuration information, at least one message indicating a need for reducing the timing error, to receive the first positioning reference signal and the second positioning reference signal, and to perform timing error reduction on the basis of the received first positioning reference signal and second positioning reference signal. This distinguishes from the conventional solution where the terminal device merely reports the inaccuracy of the timing error.

In an embodiment, the received calibration configuration information comprises a first message indicating the first PRS pattern and a second message indicating the second PRS pattern. Accordingly, the network element may trigger the transmission of the PRSs having the different patterns tailored for the different timing error types separately, e.g. sequentially during the same positioning session.

The procedure of using the tailored PRSs for reducing the timing error may be called calibration. In an embodiment, the terminal device and/or the TRP reports the need for the calibration per timing error type. One timing error type may require more frequent calibration than the (an)other type(s). This may be dependent on the temperature, bandwidth, carrier frequency, etc. Therefore, it may be feasible to report the need for the calibration per timing error type so that the LMF is able to tailor the PRS patterns on the basis of the need. Accordingly, the terminal device or the TRP may transmit, before receiving the first positioning reference signal or before receiving the calibration information, a message indicating a need to reduce the timing error of the first type but not the timing error of the second type, and transmit before receiving the second positioning reference signal, a message indicating a need to reduce the timing error of the second type but not the timing error of the first type. The timing error of the first type may be a result of the STO or CFO and the timing error of the second type may be a result of the PN.

In an embodiment, the network element collates the reports indicating the needs for the calibration from several terminal devices, e.g. dozens or hundreds or even more terminal devices, and bundles the calibration procedures of different terminal devices together. For example, upon detecting that at least a determined number (greater than one) terminal devices indicate the need to calibrate a certain type of timing error, e.g. one of the CFO, STO, PN, the network element may configure the TRPs to transmit a PRS tailored to calibrate the needed type of timing error, e.g. by following the tailoring principles described above, to the terminal devices. Accordingly, multiple terminal devices may perform the calibration by using the same PRSs transmitted by the configured TRPs.

In an embodiment, the network element may configure via the calibration information a sequential transmission of multiple of the above-described different patterns (type 0 to type 4) of PRSs, depending on the calibration needs reported by the terminal devices. During a single positioning session, even all types of PRS patterns may be transmitted, or a selected subset of at least two or at least three different patterns may be utilized during the single positioning session. Since the tailoring is used to reduce the number of PRS symbols, more efficient calibration can be performed than in a case where only type 0 would be used.

In an embodiment, the receiving device performing the calibration is configured to perform both the timing error reduction and positioning measurements on the basis of the first positioning reference signal, and similarly to perform both timing error reduction and positioning measurements on the basis of the second positioning reference signal, and to report the positioning measurements to the network element. Accordingly, the same PRS may be used for both calibration and positioning measurements, thus providing efficient calibration in terms of signaling overhead.

With respect to the interfaces between the network element, TRPs, and terminal devices, the network element (LMF) may communicate with the TRPs over a NRPPa (New Radio Positioning Protocol A) interface and with the terminal devices over an LTE positioning protocol (LPP). Over the course of development of the 5G New Radio, the protocols may evolve and take different forms and names, so these examples of the protocols should be taken as they are, examples.

Figure 6:
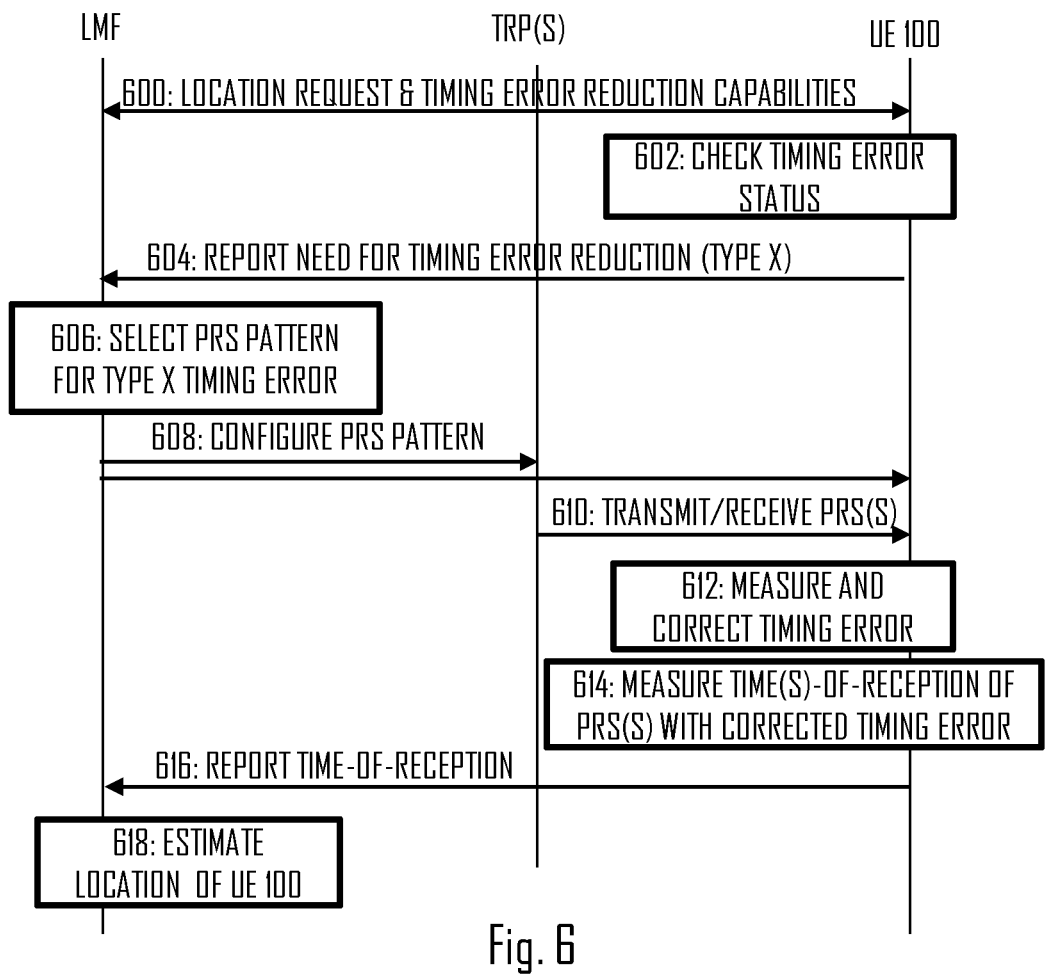
FIGS. 6 and 7 illustrate embodiments of a timing error calibration procedure based regular timing error reports.
Figure 7:
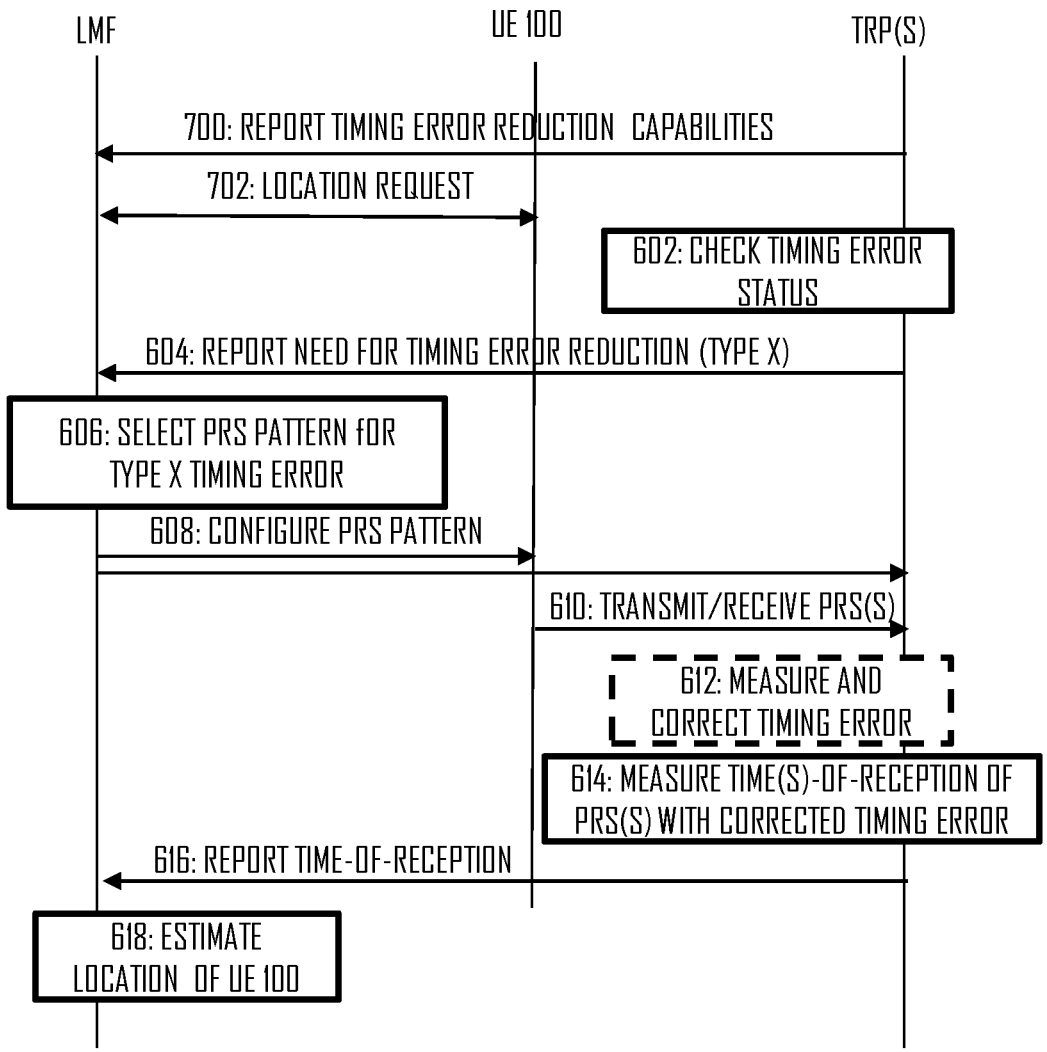
Figure 8:
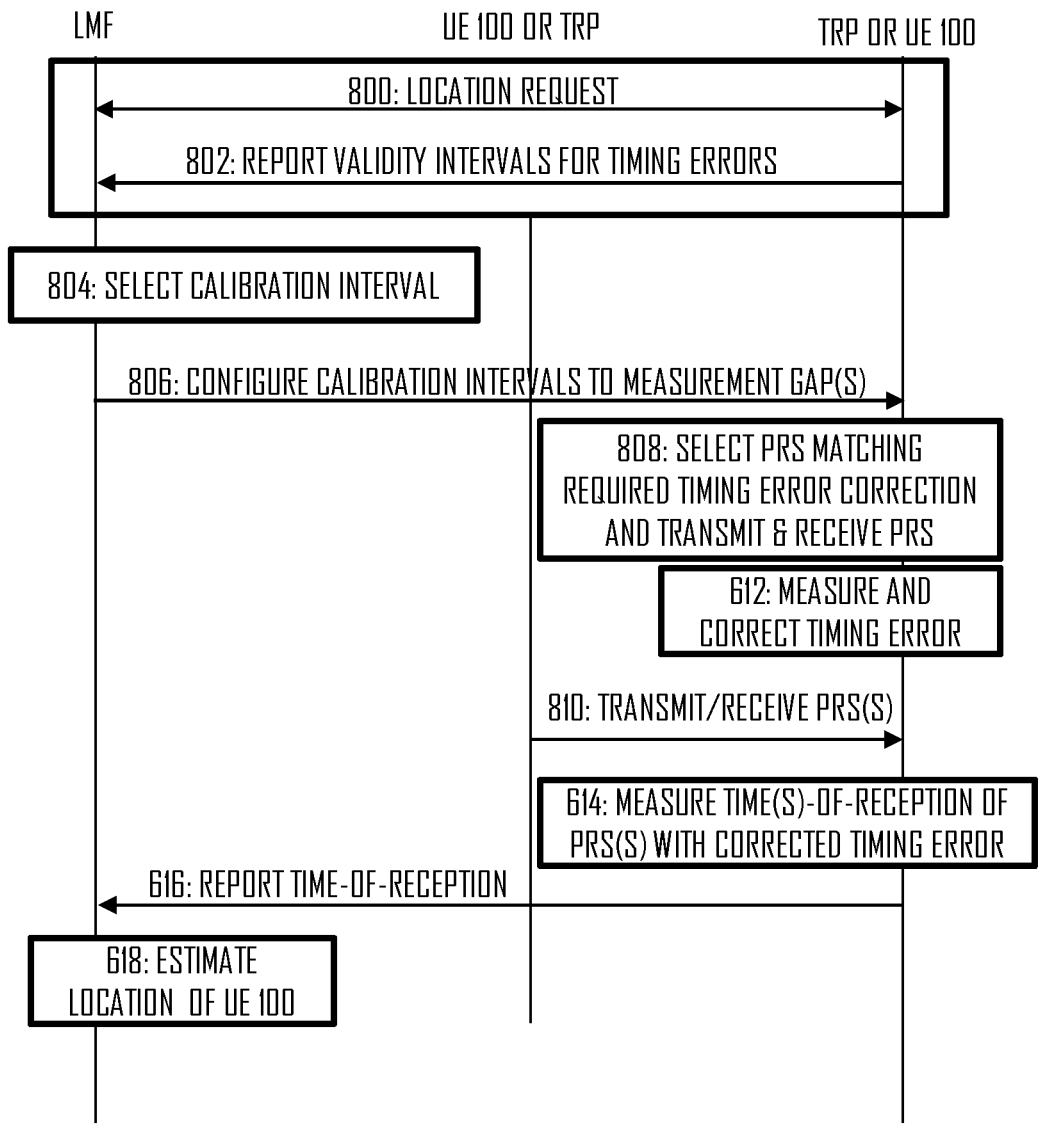
FIG. 8 illustrates an embodiment of a procedure for configuring a repeating calibration interval.

FIGS. 6 to 8 illustrate some embodiments of implementing the calibration procedures. FIGS. 6 and 7 illustrate procedures where the terminal devices and/or TRPs regularly report the state of the different timing error types and, thus, indicate the need for the calibration immediately when the timing error of a certain type exceeds a determined threshold. The network element then reacts to the need and instructs the calibration procedure. FIG. 8 illustrates a procedure where the terminal devices and/or TRPs indicate an estimate of a time interval for which each timing error type is within tolerable range after its calibration, and the network element then assigns a periodical calibration interval to each terminal device and/or TRP on the basis of the reported time intervals. This may be understood as a proactive approach because the calibration is configured before a need for the calibration actually arises.

Referring to the embodiment of FIG. 6, the terminal device 100 and the network element (LMF) carry out a setup of the positioning session in step 600. Step 600 may include communication of a location request (e.g. a LPP request) and the terminal device reporting its capabilities to the LMF. The capabilities may include a positioning mode supported by the terminal device, e.g. downlink PRS measurements or uplink PRS measurements, supported frequency bands, and support for inter-frequency measurements. In the downlink PRS measurements, the TRPs transmit the PRSs and the terminal device measures the PRSs, while the roles are reversed in the uplink PRS measurements. The capabilities may further include the capabilities of the terminal device to perform the calibration. The terminal device may indicate, for example, which timing error types it is capable of estimating/predicting and compensating.

Upon completing the setup, the terminal device may monitor the status of the timing error, e.g. whether a timing error estimate is valid and for how long per each timing error type. The reception and the transmission timing errors may be considered to be equal within the same device. So if the terminal device measures or estimates its reception timing error, it may apply the same estimate to the transmission timing error and correct the transmission timing appropriately. In case the terminal device is currently performing data reception and/or otherwise receiving reference signals from the access node(s), the terminal device may measure the reception timing error (group) from these signals. The monitoring may be carried out periodically. Block 602 may comprise determining, per timing error type, whether or not the timing error of the particular type is still within an acceptable range for the positioning and, optionally, under which conditions it is in the acceptable range. For example, the following parameters and their values or ranges may define whether or not the timing error of the particular type is within the acceptable range: temperature, PRS bandwidth, and carrier frequency. The terminal device may follow the drift of the timing error and estimate for how long the timing error still stays within the acceptable range. As a result of block 602, the terminal device 100 may generate a report indicating the current status of the timing errors. The report generated in block 602 and reported to the LMF in step 604 over the LPP interface may have the following structure.

| Timing error type | Validity | BW | Temp | Carrier f |
|---|---|---|---|---|
| STO | OK | BW(1) | Range(T1) | Range(f1) |
| CFO | OK | BW(2) | Range(T2) | Range(f2) |
| PN | Not OK | — | — | — |

This report then indicates to the LMF that the timing errors based on STO and CFO do not need calibration, provided that the bandwidth(s) of the communicated PRS(s) stay within the respective reported bandwidths BW(1) and BW(2), the temperature stays within the respective ranges and the carrier frequency is within the respective reported ranges. However, the timing error caused by the PN is reported to need calibration, so the LMF may then trigger the calibration by configuring transmission of a future PRS according to the PRS pattern tailored for calibrating the timing error based on the PN (the time-localized PRS) in block 606. The timing error type indicating to need calibration need not to have any conditions reported. The LMF may use the information reported by the terminal devices to allocate the PRSs and/or to trigger the calibration procedure. For example, if a terminal device reports that the timing errors of all types stay within the acceptable range under certain conditions, e.g. within a certain bandwidth range and within a certain carrier frequency range, the LMF may configure a PRS pattern that meets these conditions. Accordingly, the need for the calibration may be avoided. In an embodiment, the terminal device may also report the estimate of the time period for which a particular timing error type will stay within the acceptable from the time instant of reporting.

Upon determining to trigger the calibration procedure, the LMF selects the PRS pattern matching with the timing error type requested by the terminal device to be calibrated, and configures the TRP(s) to transmit the PRS and the terminal device to receive the PRS according to the selected PRS pattern (step 608). In step 610, the TRP(s) transmit and the terminal device receives the PRS according to the configured PRS pattern. In block 612, the terminal device measures the received PRS and corrects the timing error. The terminal device may also measure (block 614) an uncorrected reception timing of the PRS and, after the timing error correction (reduction) in block 612, the terminal device may carry out respective correction to the reception timing in block 614, thus providing a corrected estimate of the reception timing. The terminal device may then report the corrected time-of reception of the PRS (and one or more other parameters measured from the received PRS) to the LMF in step 616. Blocks 612 and 6145 may be performed for PRSs received from multiple TRPs and reported in a single report in step 616. Then, the LMF may estimate the location of the terminal device in block 618. During the positioning session, steps 602 to 618 may be performed in a repeating manner. It should be noted that some steps may be carried out more than others. For example, other PRS transmissions may be carried out between the transmission of the tailored PRSs. In other words, the repetition rate of blocks 602 and 604 may be smaller than a repetition rate of positioning occasions.

As described above, block 606 may include waiting until a determined number of terminal devices served by the same TRPs or PRSs require the calibration of the particular timing error type and, thereafter, triggering the calibration jointly for the determined number of terminal devices. In another embodiment, the LMF may collate the calibrations of different timing error types. For example, if multiple terminal devices report the need to calibrate the timing error caused by the CFO, the LMF may select the type 2 PRS pattern in block 606. However, if a first set of one or more terminal devices indicates a need for calibrating the timing error caused by the STO while a second set of one or more terminal device indicates a need for calibrating the timing error caused by the PN, the LMF may choose a different strategy to jointly calibrate the first and second set of terminal devices. For example, the LMF may select type 4 PRS (high density in both time and frequency domain). Another strategy could be to prioritize the terminal devices of the first and second sets according to urgency of the calibration, e.g. latency requirements of the respective positioning sessions, and to first select and configure a PRS pattern tailored to serve the most urgent terminal device(s) with the calibration procedure meeting its/their need and, thereafter, select and configure another PRS pattern or other PRS patterns meeting the needs of the less urgent terminal devices.

FIG. 7 illustrates an embodiment where the roles of the terminal device and the TRP(s) are reversed in the sense that the TRPs perform the calibration and the terminal device transmits the tailored PRSs. The steps denoted by the same reference number represent the same or substantially similar steps or functions as in FIG. 6, with the exception that the device performing the steps is different. Referring to FIG. 7, since the TRP(s) performing calibration are not being positioned in the positioning session, block 600 is replaced by step 700 where the TRP(s) report their respective timing error reduction capabilities to the LMF via the NRPPa interface. The reported capabilities may be substantially the same as described above in connection with FIG. 6 for the terminal device. In step 702, the location request is communicated between the terminal device and the LMF, and step 702 may include the same positioning capability reporting as described above in connection with block 600. Thereafter, blocks 602 to 618 may be carried out substantially in the same manner as described above. The only difference is that in connection with FIG. 6 all the TRPs involved in the positioning of the terminal device would be configured to transmit the tailored PRSs, while the timing error reduction in block 612 of FIG. 7 need to be carried out by only a subset of TRPs involved in the positioning of the terminal device. The timing errors of the different TRPs may evolve differently and, thus, they may be calibrated with different rhythms. In another embodiment, the LMF may choose to carry out the calibration so that as many TRPs as possible (multiple TRPs) could be calibrated jointly via a single transmission of a tailored PRS transmitted by the terminal device.

As an alternative to the periodic or otherwise regular reporting of the timing error status, as described above in connection with FIGS. 6 and 7, the terminal device may trigger the report in an event-based manner. For example, the terminal device may maintain a timer or another measure of the timing error acceptability. Once the terminal device determines that the timing error calibration is needed, it may send a message requesting the LMF to trigger the calibration. The report may indicate the timing error type for which the calibration is requested (CFO, STO, or PN). The event-based reporting could be based on a change in the conditions that trigger the need for the calibration, e.g. increase of the temperature above a threshold, a change in the bandwidth above a threshold or a change in the carrier frequency.

In step 608, the LMF may indicate via the selection of the PRS pattern, for example, which one or more of the timing error types the terminal device shall estimate and cancel. This may be advantageous in a case where the tailored PRS pattern is selected to simultaneously serve multiple terminal devices with different calibration needs.

In an embodiment of step 616, the terminal device may report an estimate of the time period for how long the calibration performed in block 612 is valid. In other words, after performing the timing error correction, the terminal device may indicate to the LMF for how long the timing error stays within the acceptable range so that the LMF knows for how long the timing error stays acceptable. The LMF may use this information to determine a duration for using a PRS pattern that is not tailored to the timing error reduction.

FIG. 8 illustrates an embodiment of the procedure for performing the self-calibration of the reception timing error. The self-calibration may be understood such that the device performing the timing error reduction both transmits and receives the tailored PRS, e.g. the TRP or the terminal device 100 being positioned. In such a case, the device may itself select the PRS pattern to match with the timing error that needs to be reduced. Alternatively, the selection of the PRS pattern(s) for the self-calibration may still be performed by the LMF and configured to the device.

Referring to FIG. 8, step 800 may substantially correspond to step 700 or 702, depending on whether the device performing the self-calibration is the terminal device or the TRP. In step 802, the TRP or terminal device (from now on called 'device') reports the estimated time period for either each timing error type or for the timing error type having the shortest estimated time period, wherein the estimated time period indicates the time period for how long the timing error is considered to stay acceptable after the calibration. In an embodiment, the device reports in block 802 its other capabilities for the timing error correction. For example, the device may inform one or more of the following capabilities: timing error types that can be estimated and reduced, a length of the calibration interval requested or supported, the estimated time period for the different timing error types, an expected accuracy of reducing the timing error for each timing error type, e.g., expected residual timing error after STO/CFO, PN timing error reduction, temperature and/or bandwidth and/or carrier frequency ranges over which the estimated time period is applicable (corresponding to the above-described conditions).

Upon receiving the report in step 802, the LMF is able to select a calibration interval for the device in block 804. The calibration interval may be selected according to the timing error type needing the most frequent calibration interval, e.g. to have a periodicity equal to or greater than the estimated time period of such a timing error type. Another option is to collate the time periods and estimate the calibration interval such that the total timing error that includes the contribution of all timing error types of the device stays within the acceptable range. In step 806, the LMF configures the calibration interval(s) to the device. The calibration intervals may be configured to measurement gaps readily available between data transmissions. The measurement gaps are time intervals between data communication instants of a terminal device with an access node 104. The measurement gaps may be used to perform measurements that cannot be performed while transmitting/receiving with the access node. The measurement gaps may be used to perform inter-frequency and inter-radio-access-technology measurements.

Upon receiving the information on the configured calibration intervals, the device gains knowledge of the time intervals when it can perform the self-calibration. In block 808, the device then selects the tailored PRS pattern(s)

matching with the timing error type(s) that need to be corrected. The device then both transmits and receives the tailored PRS matching with the selected PRS pattern in block 808. The device thus emulates the transmitting device, e.g. the terminal device emulates the TRP transmission of the tailored PRS. Simultaneous transmission and reception may require full duplex capabilities of the device. Upon receiving the self-transmitted PRS in block 808, the device may perform block 612 in the above-described manner. The actual positioning would then be performed on the basis of another PRS received from the transmitting device in step 810. If the device performing the self-calibration is the terminal device, the transmitting device would be the TRP. Then, steps 614 to 618 may be performed in the above-described manner.

To summarize the proactive calibration from the perspective of the terminal device, the calibration configuration information may indicate at least one calibration interval for communicating the first positioning reference signal and the second positioning reference signal, and the terminal device may both transmit and receive the first positioning reference signal and the second positioning reference signal during the at least one calibration interval, and perform the timing error reduction on the basis of the received first positioning reference signal and second positioning reference signal. The procedure of FIG. 8 may be performed once or multiple times during the positioning session. In particular, the self-calibration of blocks 808 and 612 may be performed multiple times (e.g. periodically) during the positioning session, with varying PRS patterns.

Figure 9:
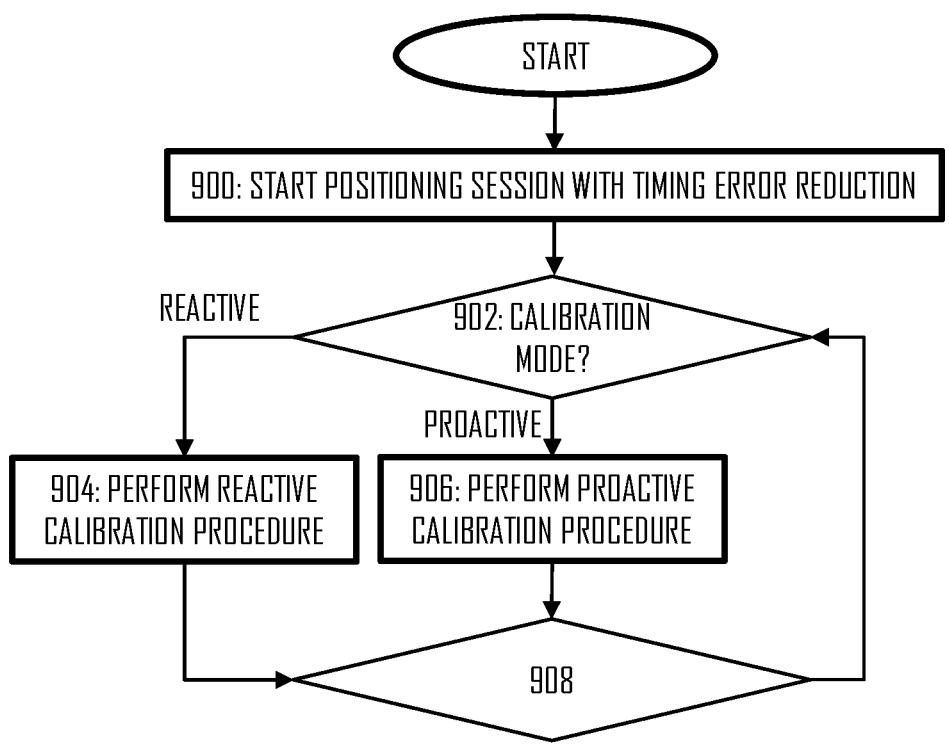
FIG. 9 illustrates a process for switching between different timing error calibration modes.

In an embodiment, the LMF, the terminal device, and the TRPs may support all types of calibration (the reactive ones of FIGS. 6 and 7 and proactive one of FIG. 8). The LMF may choose to use the proactive calibration if the reactive calibration is not approved by one or more of the involved TRPs, e.g. the PRS pattern is not supported by the TRP(s). Alternatively, the LMF may resort to prefer the proactive calibration over the reactive calibration, if a serving beam/sector of the terminal device is sparsely populated. The proactive calibration results in a smaller amount of signaling (less reporting) and may thus be preferred. Another criterion for changing the calibration mode may be performance of a current calibration mode. For example, if it is deemed that the calibration periods are too infrequent in the proactive mode, the LMF may either increase the frequency of the calibration periodicity or to change to the reactive calibration mode. On the other hand, if there is high congestion of traffic, the LMF may switch from the reactive calibration mode to the proactive calibration mode to reduce the signaling overhead. FIG. 9 illustrates an embodiment for switching between the calibration modes. The procedure may be carried out in all devices involved in the calibration procedure, e.g. the LMF, the TRP, and the terminal device.

Referring to FIG. 9, the positioning session of the terminal device is started in block 900, and the positioning session is deemed to include the timing error calibration. In block 902, the calibration mode (reactive mode of proactive mode) is selected. The selection criterion may be any one of the above-described criteria. Thereafter, either block 904 (the procedure of FIG. 6 or 7) or block 906 (the procedure of FIG. 8) may be followed. During the positioning session, the LMF, the TRP, and/or the terminal device may evaluate a need to change the calibration mode (block 908). If the need for changing the calibration mode arises, block 902 may be repeated. The procedure may end upon ending the positioning session.

Figure 10:
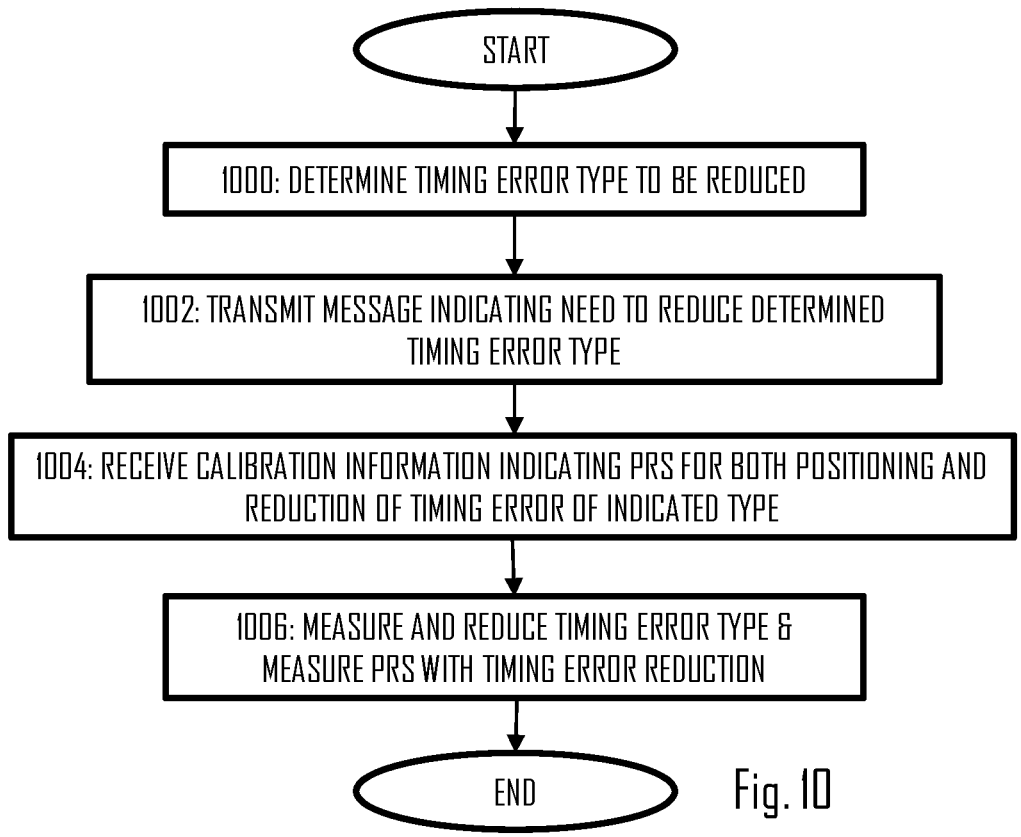
FIG. 10 illustrates a process for using a tailored positioning reference signal for both timing error reduction and positioning according to an embodiment.

FIG. 10 illustrates yet another formulation of the above-described concept of using the tailored PRSs to perform both timing error reduction and positioning of the terminal device. Referring to FIG. 10, the process executed in an apparatus for the terminal device comprises: determining that one of multiple timing error types needs to be reduced (block 1000); upon so determining causing transmission (block 1002) of a message to the network element operating the LMF, the message comprising at least one information element indicating the timing error type that needs to be reduced; receiving (in block 1004 after block 1002), the above-described calibration information configuring at least one PRS tailored to the timing error type indicated in block 1002; and measuring timing error of the determined timing error type from the received PRS, performing the timing error reduction and generating measurement data on the PRS, wherein the timing error has been reduced from the generated measurement data. As described above, the measurement data may then be used for positioning the terminal device. From the perspective of the network element (LMF), the respective process comprises as performed by the network element; receiving the message comprising at least one information element indicating the timing error type that the terminal device needs reduce; transmitting, to the terminal device and to the TRP(s), the calibration information configuring the at least one PRS tailored to the timing error type indicated; and receiving the measurement data from which the timing error has been reduced and estimating the location of the terminal device on the basis of the measurement data.

In an embodiment, the procedure of FIG. 10 is performed per each of the multiple timing error types the terminal device is aware of and is monitoring. As described above, the terminal device is thus capable of indicating the need for a particular type of PRS tailored to reduce the particular type of timing error for which the terminal device has observed the need for reduction. Accordingly, the terminal device may separately request for transmission of the PRS tailored to reduce the timing error caused by the PN, transmission of the PRS tailored to reduce the timing error caused by the CFO, and transmission of the PRS tailored to reduce the timing error caused by the STO. This enables the network element to tailor the PRS to the specific needs of the terminal devices and, accordingly, to cause transmission of a PRS having a greater localization in the time domain (for PN), greater localization in the frequency domain (STO), or both (PN and STO). The terminal device may indicate multiple timing error types in a single message transmitted in block 1002, and the network element may configure an appropriate PRS tailored to the multiple timing error types.

Figure 11:
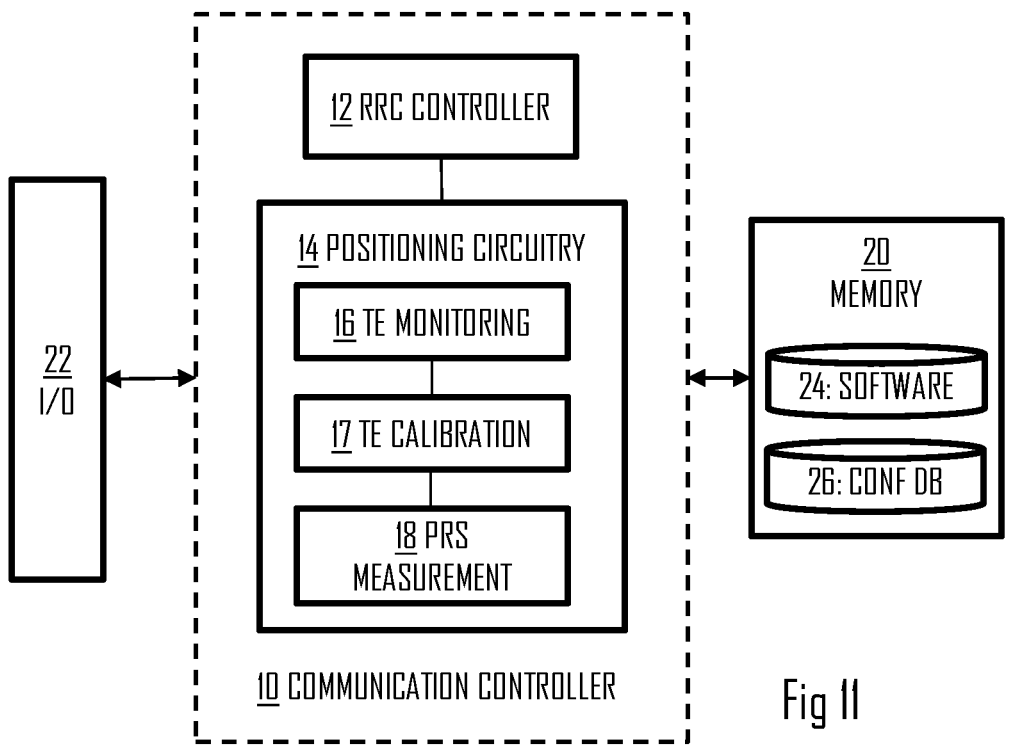
FIGS. 11 and 12 illustrate block diagrams of structures of apparatuses according to some embodiments.

FIG. 11 illustrates an apparatus comprising means for carrying out the process of FIG. 3 or any one of the embodiments described above. The apparatus may comprise a processing circuitry, such as at least one processor, and at least one memory 20 including computer program code or computer program instructions (software) 24, wherein the at least one memory and the computer program code (software) are configured, with the at least one processor, to cause the apparatus to carry out the process of FIG. 3 or any one of its embodiments described above. The apparatus may be for the terminal device 100 or for a TRP 104, 200. The apparatus may be a circuitry or an electronic device realizing some embodiments of the invention in the terminal device 100 or the TRP 104, 200. The apparatus carrying out the above-described functionalities may thus be comprised in such a device, e.g. the apparatus may comprise a circuitry such as a chip, a chipset, a processor, a micro controller, or a combination of such circuitries for the terminal device 100 or the TRP 104, 200. The at least one processor or a processing circuitry may realize a communication controller 10 controlling communications in a radio interface of the cellular communication system in the above-described manner. The communication controller may comprise an RRC controller configured to establish and manage RRC connections, transfer of data over the RRC connections between the terminal device and the TRPs/access nodes.

The communication controller 10 may comprise a positioning circuitry 14 configured to carry out the positioning of the terminal device 100 by utilizing the calibration procedure according to any one of the above-described embodiments to reduce the timing error and to improve the positioning accuracy. The positioning circuitry may comprise a timing error monitoring circuitry 16 configured to monitor the timing error status in the apparatus, as described above. The timing error status may comprise at least the reception timing error status. The timing error status may be measured or it may be monitored by tracking time since the last calibration procedure. The timing error monitoring circuitry may monitor the timing error per timing error type (STO, CFO, PN) and also estimate the total timing error and evaluate the timing error now and in the future with respect to an acceptable range. The timing error monitoring circuit 16 may also generate the report of step 604 or 802 and carry out the transmission of the report to the LMF. The positioning circuitry may further comprise a calibration circuitry 17 configured to carry out the calibration procedure in the terminal device or in the TRP according to the embodiment of FIG. 3, 6, 7, or 8, for example. On the basis of the calibration, the timing error may be reduced from positioning measurements performed by a PRS measurement circuitry 18 configured to receive the PRSs according to the configured PRS patterns and measure the PRSs for the purpose of reporting the measurements to the LMF and for positioning the terminal device 100.

In the embodiments where the apparatus is for the terminal device, the apparatus may further comprise an application processor (not shown) executing one or more computer program applications that generate a need to transmit and/or receive data through the communication controller 10 and, in some embodiment, generate a request triggering the positioning of the terminal device. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. Positioning of the apparatus may be beneficial for all these applications. The application processor may thus generate a command for executing the process of FIG. 3.

The memory 20 may be implemented using any suitable data storage technology, such as semiconductor-based memory devices, flash memory, magnetic memory devices and systems, optical memory devices and systems, fixed memory and removable memory. The memory may further store a configuration database storing, for example, parameters for the timing error types and the above-described conditions.

The apparatus may further comprise a communication interface 22 comprising hardware and/or software for providing the apparatus with radio communication capability, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface. In embodiments where the apparatus is the TRP, the apparatus may further comprise a second interface configured to support the NRPPa protocol or a similar protocol enabling communications with the LMF or a network element with similar functionality.

Figure 12:
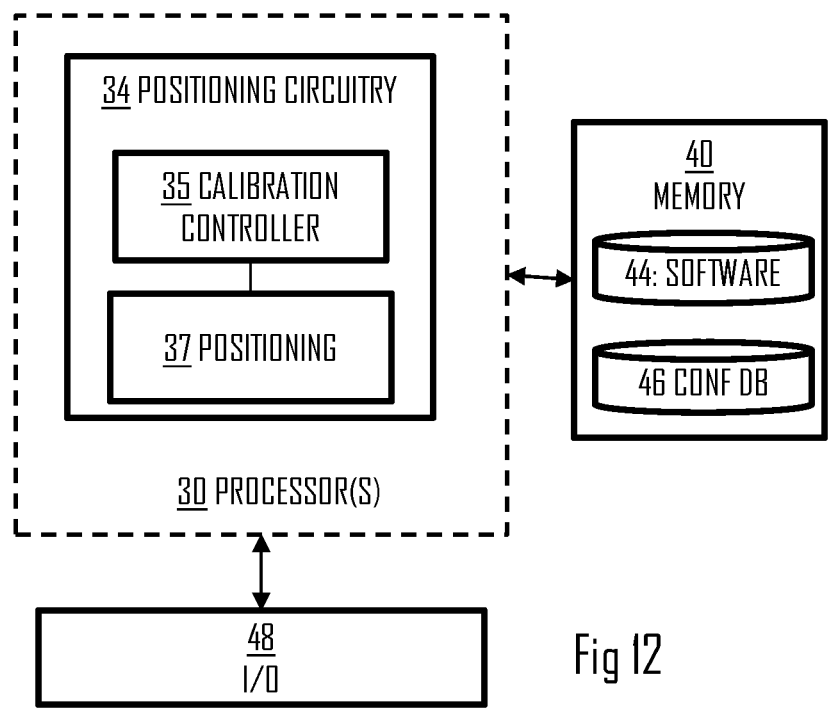

FIG. 12 illustrates an apparatus comprising a processing circuitry, such as at least one processor 30, and at least one memory 40 including a computer program code or computer program instructions (software) 44, wherein the at least one memory and the computer program code or computer program instructions are configured, with the at least one processor, to cause the apparatus to carry out functions of the network element or network node for the LMF in the flow diagram of FIG. 4 or any one of embodiments thereof described above. The apparatus may be for a network element or network node operating as the LMF. The apparatus may be a circuitry or an electronic device realizing some of the above-described embodiments in the network element. The apparatus carrying out the above-described functionalities may thus be comprised in such a device, e.g. the apparatus may comprise a circuitry such as a chip, a chipset, a processor, a micro controller, or a combination of such circuitries for the network element. In other embodiments, the apparatus is the network element. The at least one processor or a processing circuitry may realize a positioning circuitry 34 configured to determine a location of the terminal device 100 according to any one of the above-described embodiments. The positioning circuitry 34 may comprise positioning module 37 configured to receive the above-described measurement data and to compute the location of the terminal device on the basis of the measurement data. According to the above-described embodiments, at least some of the measurement data has been subjected to the timing error correction. The computation may follow state-of-the-art procedures. The positioning circuitry 34 may further comprise a calibration module 35 configured to determine the characteristics of timing errors reported by the terminal device 100 and to select an appropriate calibration procedure for calibrating the timing error from the PRS measurements for positioning the terminal device 100. The calibration circuitry may follow the procedure of any one of the FIGS. 4, 6, 7, 8, and in an embodiment it performs the procedure of FIG. 9.

The memory 40 may be implemented using any suitable data storage technology, such as semiconductor-based memory devices, flash memory, magnetic memory devices and systems, optical memory devices and systems, fixed memory and removable memory. The memory may further store a configuration database 46 storing, for example, the timing errors reported by the terminal devices communicating with the network element. The apparatus may further comprise a communication interface 48 configured to realize the connectivity with the TRPs and the terminal devices. The communication interface 48 may comprise necessary hardware and software to realize the connectivity.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 3 to 10, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units. References to computer-readable program code, computer program, computer instructions, computer code etc. should be understood to express software for a programmable processor such as programmable content stored in a hardware device as instructions for a processor, or as configured or configurable settings for a fixed function device, gate array, or a programmable logic device.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus, comprising means for performing:
   receiving, from a network element, calibration configuration information for communicating at least one positioning reference signal and for reducing timing error affecting positioning of the apparatus;
   communicating, during a positioning session and on the basis of the received calibration configuration information, a first positioning reference signal according to a first positioning reference signal pattern for reducing a timing error of a first type, the first positioning reference signal pattern defining a first number of frequency resource elements and a first number of time resource elements for the first positioning reference signal; and
   communicating, during the positioning session or during another positioning session and on the basis of the received calibration configuration information, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and/or wherein the second number of time resource elements is greater than the first number of time resource elements; and
   wherein the means are configured to transmit to the network element, before receiving the calibration configuration information, at least one message indicating a need for reducing the timing error, to receive the first positioning reference signal and the second positioning reference signal, and to perform timing error reduction on the basis of the received first positioning reference signal and second positioning reference signal.

2. The apparatus of claim 1, wherein the received calibration configuration information comprises a first message indicating the first positioning reference signal pattern and a second message indicating the second positioning reference signal pattern.

3. The apparatus of claim 2, wherein the means are configured to transmit, before receiving the first positioning reference signal, a message indicating a need to reduce the timing error of the first type but not the timing error of the second type, and to transmit before receiving the second positioning reference signal, a message indicating a need to reduce the timing error of the second type but not the timing error of the first type.

4. The apparatus of claim 1, wherein the timing error of the first type is a result of a symbol timing offset or a carrier frequency offset and the timing error of the second type is a result of phase noise.

5. The apparatus of claim 1, wherein the means are configured to: receive the first positioning reference signal and to perform both timing error reduction and positioning measurements on the basis of the first positioning reference signal, and to receive the second positioning reference signal and to perform both timing error reduction and positioning measurements on the basis of the second positioning reference signal, and to report the positioning measurements to the network element.

6. The apparatus of claim 1, wherein the means are configured to receive the first positioning reference signal and the second reference signal from at least one transmission-reception node configured to assist in the positioning of the apparatus.

7. The apparatus of claim 1, wherein the calibration configuration information indicates at least one calibration interval for communicating the first positioning reference signal and the second positioning reference signal, and wherein the means are configured to both transmit and receive the first positioning reference signal and the second positioning reference signal during the at least one calibration interval, and to perform the timing error reduction on the basis of the received first positioning reference signal and second positioning reference signal.

8. An apparatus comprising means for performing:
   transmitting, to a terminal device, calibration configuration information for communicating at least one positioning reference signal and for reducing timing error affecting positioning of the terminal device;

causing the terminal device to communicate, during a positioning session of the terminal device, a first positioning reference signal according to a first positioning reference signal pattern for reducing a timing error of a first type, the first positioning reference signal pattern defining a first number of frequency resource elements and a first number of time resource elements for the first positioning reference signal;

causing the terminal device to communicate, during the positioning session or another positioning session, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and wherein the second number of time resource elements is greater than the first number of time resource elements; and wherein the means are configured receive, from the terminal device during the positioning session, a timing error report indicating a need for reducing timing error, and to transmit the calibration configuration information as a response to the timing error report.

9. The apparatus of claim 8, wherein the means are configured to:

if the timing error report indicates a need to reduce the timing error of the first type, transmit to the terminal device calibration configuration information causing the communication of the first positioning reference signal; and if the timing error report indicates a need to reduce the timing error of the second type, transmit to the terminal device calibration configuration information causing the communication of the second positioning reference signal.

10. The apparatus of claim 8, wherein the timing error report indicates a need for reducing a timing error of a third type, and wherein the means are configured to, in response to the need for reducing timing errors of both the first type and the second type, transmit to the terminal device calibration configuration information causing communication of a third positioning reference signal according to a third positioning reference signal pattern for reducing the timing errors of both the first type and the second type, the third positioning reference signal pattern defining a third number of frequency resource elements and a third number of time resource elements for the third positioning reference signal, wherein the third number of frequency resource elements is greater than the second number of frequency resource elements and wherein the third number of time resource elements is greater than the first number of time resource elements.

11. The apparatus of claim 8, wherein the means are configured to:

receive from the terminal device and at least one other terminal device, before transmitting the calibration configuration information, a timing error report indicating a need for reducing the timing error of the first type;

transmit to the terminal device and the at least one other terminal device, as the calibration configuration information, an indication of the first positioning reference signal pattern, and configure the transmission-reception node to transmit the first positioning reference signal to the terminal device and the at least one other terminal device for reducing the timing error of the first type.

12. The apparatus of claim 8, wherein the means are configured to receive, in response to the communication of the first positioning reference signal and the second positioning reference signal, measurement data indicating a location of the terminal device and to estimate the location of the terminal device on the basis of the measurement data.

13. The apparatus of claim 8, wherein the means comprises at least one processor and at least one memory storing instructions that cause said performance of the apparatus.

14. A method comprising:

receiving, from a network element, calibration configuration information for communicating at least one positioning reference signal and for reducing timing error affecting positioning of a terminal device;

communicating, during a positioning session and on the basis of the received calibration configuration information, a first positioning reference signal according to a first positioning reference signal pattern for reducing a timing error of a first type, the first positioning reference signal pattern defining a first number of frequency resource elements and a first number of time resource elements for the first positioning reference signal;

communicating, during the positioning session or during another positioning session and on the basis of the received calibration configuration information, a second positioning reference signal according to a second positioning reference signal pattern for reducing a timing error of a second type, the second positioning reference signal pattern defining a second number of frequency resource elements and a second number of time resource elements for the second positioning reference signal, wherein the second number of frequency resource elements is smaller than the first number of frequency resource elements and/or wherein the second number of time resource elements is greater than the first number of time resource elements;

transmitting to the network element, before receiving the calibration configuration information, at least one message indicating a need for reducing the timing error, receiving the first positioning reference signal and the second positioning reference signal, and performing timing error reduction on the basis of the received first positioning reference signal and second positioning reference signal.

15. The method of claim 14, wherein the received calibration configuration information comprises a first message indicating the first positioning reference signal pattern and a second message indicating the second positioning reference signal pattern.

16. The method of claim 15, further comprising:

transmitting, before receiving the first positioning reference signal, a message indicating a need to reduce the timing error of the first type but not the timing error of the second type, and transmitting before receiving the second positioning reference signal, a message indicating a need to reduce the timing error of the second type but not the timing error of the first type.

17. The method of claim 14, wherein the timing error of the first type is a result of a symbol timing offset or a carrier frequency offset and the timing error of the second type is a result of phase noise.

* * * * *